United States Patent [19]
Setani et al.

[11] Patent Number: 6,016,222
[45] Date of Patent: Jan. 18, 2000

[54] COLOR IMAGE READING APPARATUS

[75] Inventors: Michitaka Setani, Kawasaki; Emiko Ueno, Tokyo, both of Japan

[73] Assignee: Canon Kabushiki Kaisha, Tokyo, Japan

[21] Appl. No.: 08/971,104

[22] Filed: Nov. 14, 1997

[30] Foreign Application Priority Data

Nov. 20, 1996 [JP] Japan .................................. 8-324590

[51] Int. Cl.[7] .................................................. G02B 5/18
[52] U.S. Cl. ........................................... 359/571; 359/558
[58] Field of Search .................................. 359/587, 588, 359/589, 883, 884, 571

[56] References Cited

U.S. PATENT DOCUMENTS

| | | | |
|---|---|---|---|
| 5,329,353 | 7/1994 | Ichimura et al. | 356/328 |
| 5,362,957 | 11/1994 | Nakai et al. | 250/208.1 |

OTHER PUBLICATIONS

H. Dammann, "Color Separation Gratings," Applied Optics, vol. 17, No. 15, pp. 2273–2279 (Aug. 1978).

*Primary Examiner*—Cassandra Spyrou
*Assistant Examiner*—Craig Curtis
*Attorney, Agent, or Firm*—Fitzpatrick, Cella, Harper & Scinto

[57] ABSTRACT

A color image reading apparatus includes a light receiving device having a plurality of line sensors disposed on a surface of a common substrate, an imaging optical system for forming an image of an object, a blazed diffraction grating, disposed in an optical path between the imaging optical system and the light receiving device, for color-separating a beam from the object into a plurality of color beams, a first optical element provided near a position where the plurality of color beams are focused in a sub scanning cross section by the imaging optical system and a second optical element provided in an optical path between the first optical element and the light receiving device. The plurality of color beams color-separated by the blazed diffraction grating are focused on the light receiving device through the first optical element and the second optical element.

9 Claims, 9 Drawing Sheets

SUB SCANNING SECTION

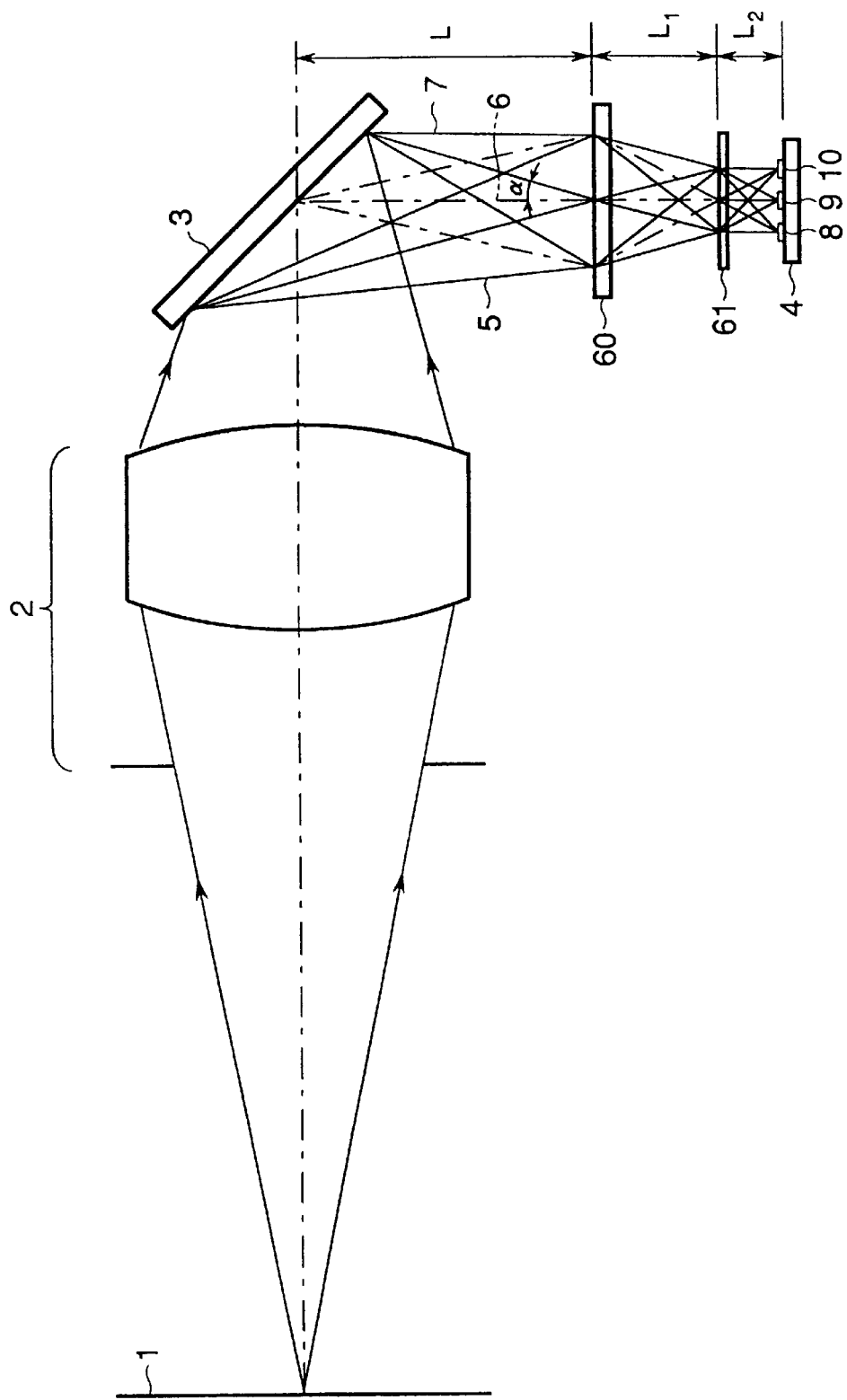

COLOR IMAGE READING APPARATUS

BACKGROUND OF THE INVENTION

1. Field of the Invention

The present invention relates to color image reading apparatus and, more specifically, to color image reading apparatus, suitably applicable, for example, to color scanners, color facsimile devices, and the like, that can precisely read color image information on an original surface without lowering the reading resolution in the sub scanning direction by use of color separation means comprised of a reflection type or transmission type one-dimensional blazed diffraction grating, light receiving means comprised of plural (three) line sensors (light receiving elements) disposed on a common substrate surface, and a diffraction optical element.

2. Related Background Art

A variety of proposals have been presented heretofore on apparatus for forming an image of color image information on the original surface, on a surface of line sensor (CCD) through an optical system and digitally reading it by making u se of output signals from the line sensor at this time.

For example, FIG. 1 is a schematic diagram to show the major part of the optical system of a conventional color image reading apparatus. In the same figure, when a beam from a color image on original surface 81 is condensed by imaging lens 89 to be focused on a surface of each line sensor described below, the beam is color-separated into three colors, for example red (R), green (G), and blue (B), by 3P prism 80 and thereafter each beam is guided onto the surface of each line sensor 81, 82, 83. The color image formed on the surface of each line sensor 81, 82, 83 is read every color light by line scanning in the sub scanning direction.

FIG. 2 is a schematic diagram to show the major part of the optical system of another conventional color image reading apparatus. In the same drawing, when the beam from the color image on original surface 81 is condensed by imaging lens 89 to be focused on the line sensor surface described below, the beam is separated into three beams corresponding to the three colors by two beam splitters 90, 91 for color separation provided with wavelength-selective transmission films having dichroism.

Then the color images based on the three color beams are focused on the surface of so-called monolithic 3-line sensor 92 in which three line sensors are disposed on a common substrate surface. Then the color images thus formed are read every color beam by, line scanning in the sub scanning direction.

FIG. 3 is an explanatory drawing of the monolithic 3-line sensor 92 shown in FIG. 2. The monolithic 3-line sensor 92 has three line sensors (CCDs) 95, 96, 97 a finite distance apart from each other and in parallel on the common substrate surface as illustrated in the same figure, and a color filter, not illustrated, based on each color beam is provided on the surface of each line sensor 95, 96, 97.

Spaces S1, S2 between the line sensors 95, 96, 97 are usually made to be, for example, about 0.1 to 0.2 mm from various manufacturing conditions, and pixel widths W1, W2 of each single element 98 are set to, for example, approximately 7 $\mu$m×7 $\mu$m or 10 $\mu$m×10 $\mu$m.

The color image reading apparatus shown in FIG. 1 needs the three independent line sensors, is required to have high accuracy, and, in addition, needs the 3P prism which is not easy to manufacture. Therefore, the overall apparatus becomes complicated and expensive. Further, it necessitates three independent alignment adjustments between the imaging beams and the respective line sensors. Therefore, the apparatus had the problem that the assembly adjustments became troublesome.

In the color image reading apparatus shown in FIG. 2, when the thickness of wavelength selective transmission film of the beam splitter 90, 91 is x, the distance between the lines of line sensor is 2√2x. Supposing the distance between the lines of a line sensor preferred in respect of manufacturing is approximately 0.1 to 0.2 mm, the thickness x of wavelength selective transmission film of the beam splitter 90, 91 is approximately 35 to 70 $\mu$m.

In general, it is very difficult to construct the beam splitters in such small thicknesses while well maintaining optical planeness. Use of the beam splitters in such thicknesses raised the problem of degradation of optical performance of the color images formed on the line sensor surface.

On the other hand, the distances S1, S2 between the center line 96 and the other two lines 95, 97 of the monolithic 3-line sensor are usually set to be equal distances in the opposite directions to each other and to be equal to an integral multiple of the pixel size W2 (see FIG. 3) in the sub scanning direction as shown in FIG. 4. This is from the following reason.

When the color image is read by the above-stated monolithic 3-line sensor by use of only the ordinary imaging optical system 89 as shown in FIG. 4, reading positions on the original surface 81 that can be read simultaneously by the three line sensors 95, 96, 97 are three different positions 95', 96', 97' as illustrated.

Owing to this, signal components of the three colors (R, G, B) for an arbitrary position on the original surface 81 cannot be read at one time, so that signals must be matched and combined for each position after read by the 3-line sensor.

Synthetic signal components of the three colors are obtained relatively easily, by setting the distances S1, S2 between the lines of the 3-line sensor to the integral multiple of each pixel size W2, providing the apparatus with redundant line memories corresponding thereto, and delaying G, R signals (signal components based on the G and R color beams) with respect to B signal (a signal component based on the B color beam), for example.

Accordingly, the distances S1, S2 between the center line sensor 96 and the other two line sensors 95, 97 of the 3-line sensor are set to the integral multiple of the pixel size W2 in the sub scanning direction as described above.

However, provision of the redundant line memories corresponding to the distances between the lines of 3-line sensor in the above-stated color image reading apparatus posed problems that the apparatus must be provided with a plurality of expensive line memories, this was very disadvantageous in terms of cost, and the overall apparatus became complicated.

In addition to the above examples, another color image reading apparatus for making the color image information color-separated by a one-dimensional blazed diffraction grating as an optical element for color separation and incident to the monolithic 3-line sensor and for detecting the color image information thereby was proposed in U.S. Pat. No. 5,223,703, for example.

FIGS. 5A and 5B are drawings to show the color image reading apparatus disclosed in above U.S. Pat. No. 5,223,703. FIGS. 5A and 5B are drawings to show the arrangement in the sub scanning cross section perpendicular to the main scanning cross section. In the drawing, the image information on the original surface 101 being an object is line-scanned in the sub scanning direction (vertically on the plane of FIG. 5A) by a mirror (not illustrated) etc. disposed between the original surface and the imaging optical system 102, and then the image information light is guided through the imaging optical system 102 to reflection type one-dimensional blazed diffraction grating 103 for separation into the three colors.

Here, information light from a same position (a same line) of the original surface 101 is separated horizontally in the drawing by reflection diffraction into beams 105, 106, 107 of the three colors (for example, R, G, B) in the so-called color reading, and thereafter the beams are focused on respective sensor arrays, i.e., line sensors 108, 109, 110 on the monolithic 3-line sensor 104.

Then the image information of the original surface 101 is successively read by relative movement between the original surface 101 and the image reading apparatus (imaging optical system 102, diffraction grating 103, sensor 104) in the sub scanning direction.

Here, each sensor array 108, 109, 110 on the sensor 104 extends in the main scanning direction normal to the plane of the drawing. The sensor 104 is a monolithic 3-line sensor in which three lines of one-dimensional sensor arrays are arranged a finite distance apart from one another in a direction perpendicular to the array direction on the same substrate.

The one-dimensional blazed diffraction grating 103 is disposed in an optical path between the imaging optical system 102 and the sensor 104 and on the sensor 104 side of the exit pupil of the imaging optical system 102 and is provided for color-separating light from the object into plural beams and guiding the color-separated beams to the respective sensor arrays corresponding thereto.

The original surface 101 is illuminated by a light source for illumination not illustrated and the image information thereof is read by the image reading apparatus.

The above one-dimensional blazed diffraction grating for three-color separation is described in Applied Optics, Vol. 7, No. 15, pp 2273–2279 (Aug. 1, 1978) and the configuration thereof is as shown in the enlarged view of FIG. 5B, which is a drawing to show the configuration in the sub scanning cross section.

Incidentally, distances 116, 115 on the sensor surface 104 between separate images of ± first-order diffracted beams 107, 105 and zero-order beam 106 separated by reflection diffraction by the reflection type one-dimensional blazed diffraction grating 103 shown in FIG. 5B are expressed by the following equation, letting Z be the distances and using the symbols in FIG. 5B.

$$Z = l \times \tan\{\sin^{-1}(\pm\lambda/p + \sin\theta_0) - \theta_0\} \quad (1)$$

(where $\lambda$ is the wavelength of the information light separately imaged, $\theta_0$ an angle of incidence to the blazed diffraction grating 103, p the grating pitch, and l a distance on the optic axis between the grating and the light receiving surface).

For example, supposing in the step configuration of the reflection type blazed diffraction grating 103 the depth $h_{10}$ of the first step and the depth $h_{20}$ of the second step are $h_{10}=909$ nm and $h_{20}=1818$ nm, respectively, the center wavelength of the zero-order beam is $\lambda_0=525$ nm, that of the + first-order diffracted light is $\lambda_{+1}=592$ nm, and that of the − first-order diffracted light is $\lambda_{-1}=472$ nm. This is based on the following equation.

$$\lambda = 2h_{10}\cdot\cos\theta_0/m = 2h_{20}\cos\theta/2m \quad (2)$$

Here, $\lambda_{+1}$ is obtained by m=3−1/3, $\lambda_{-1}$ by m=3+1/3, and $\lambda_0$ by m=3 (though the values obtained are approximate values as to $\lambda_{\pm1}$).

When the grating pitch of the above diffraction grating 103 is set to p=130 μm, the distance on the optic axis between the grating and the light receiving surface to l=45 mm, and the angle of incidence to $\theta_0=30°$, $Z\lambda_{+1}=0.171$ mm, and $Z\lambda_{-1}=0.136$ mm.

This means that the 3-line sensor 104 should be constructed by such asymmetric line spaces 116, 115 that the distances between the sensor lines of the monolithic 3-line sensor 104 are 0.171 mm on the + first-order beam ($\lambda_{+1}$) side (R) (i.e., the distance 116 to the line 110) and 0.136 mm on the − first-order beam ($\lambda_{-1}$) side (B) (i.e., the distance 115 to the line 108) with respect to the center line 109 (G). This realizes a reasonable color reading apparatus not necessitating the redundant line memories for interpolation described previously.

However, the color image reading apparatus using this one-dimensional blazed diffraction grating as an optical element for color separation has a problem that the resolution of reading in the sub scanning direction is degraded by broadening, which is to be called as fine color blur, on the surface of light receiving means, which occurs when each of the ± first-order diffracted light components separated and diffracted by the one-dimensional blazed diffraction grating includes a finite wavelength band.

SUMMARY OF THE INVENTION

An object of the present invention is to provide a color image reading apparatus of such arrangement that, for reading a color image by a monolithic 3-line sensor as light receiving means while color-separating it by use of a reflection type or transmission type one-dimensional blazed diffraction grating as color separation means, a diffraction optical element is disposed in an optical path between the one-dimensional blazed diffraction grating and the monolithic 3-line sensor, thereby relaxing broadening to be called as fine color blur on the surface of light receiving means occurring when each of the ± first-order diffracted light components separated and diffracted by the one-dimensional blazed diffraction grating includes a finite wavelength band, whereby the apparatus can digitally precisely read, for example, three-color beams of R, G, and B without limiting their wavelength bands and without lowering the reading resolution in the sub scanning direction.

A color image reading apparatus of the present invention is characterized in that the apparatus is arranged to guide a color image through an imaging optical system and color separation means comprised of a one-dimensional blazed diffraction grating for color-separating an incident beam into plural color beams, onto a surface of light receiving means in which a plurality of line sensors are placed on a common substrate surface, and to perform relative movement between the color image and the light receiving means to read the color image by the light receiving means, in that a first optical element is provided near a position where the plural color beams color-separated by the color separation means are focused in a sub scanning cross section by the imaging optical system and a second optical element is provided in an optical path after the first optical element and before the light receiving means, and in that a color image based on the plural color beams color-separated by the color separation means is focused through the first optical element and the second optical element on the surface of the light receiving means.

Particularly, the present invention is characterized in that a surface of the one-dimensional blazed diffraction grating and a surface of the second optical element are in an optically conjugate relation with each other with respect to the first optical element in the sub scanning cross section and in that a surface of the first optical element and the surface of the light receiving means are in an optically conjugate relation with each other with respect to the second optical element;

in that the conjugate relation in the second optical element is an imaging relation of a reduction ratio;

in that the first optical element is divided into at least three regions and elements in the three regions have mutually different element structures;

in that the first optical element is a diffraction optical element;

in that the second optical element is a diffraction optical element;

in that the one-dimensional blazed diffraction grating is a reflection type one-dimensional blazed diffraction grating;

in that the one-dimensional blazed diffraction grating is a transmission type one-dimensional blazed diffraction grating, and so on.

BRIEF DESCRIPTION OF THE DRAWINGS

FIGS. 6A, 6B, and 6C are a sub scanning cross-sectional view of Embodiment 1 of the color image reading apparatus according to the present invention;

FIGS. 6A and 6B are schematic diagrams to show the three regions of the first diffraction optical element;

DETAILED DESCRIPTION OF THE PREFERRED EMBODIMENTS

Figure 1:
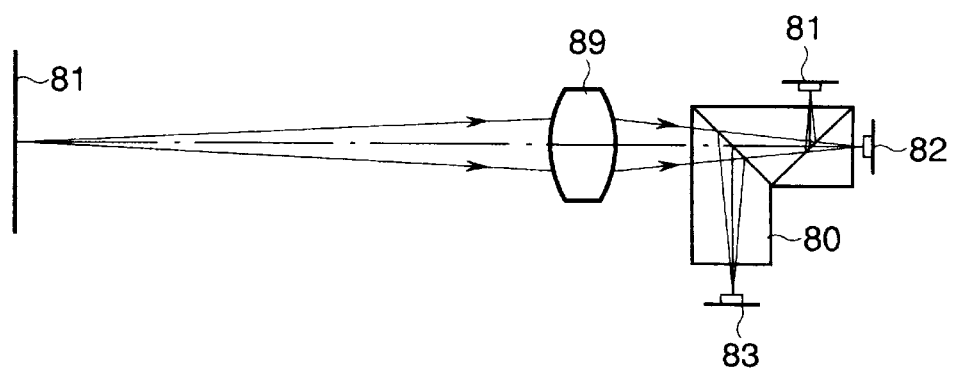
FIG 1 is a schematic diagram to show the major part of the optical system of a conventional color image reading apparatus.
Figure 2:
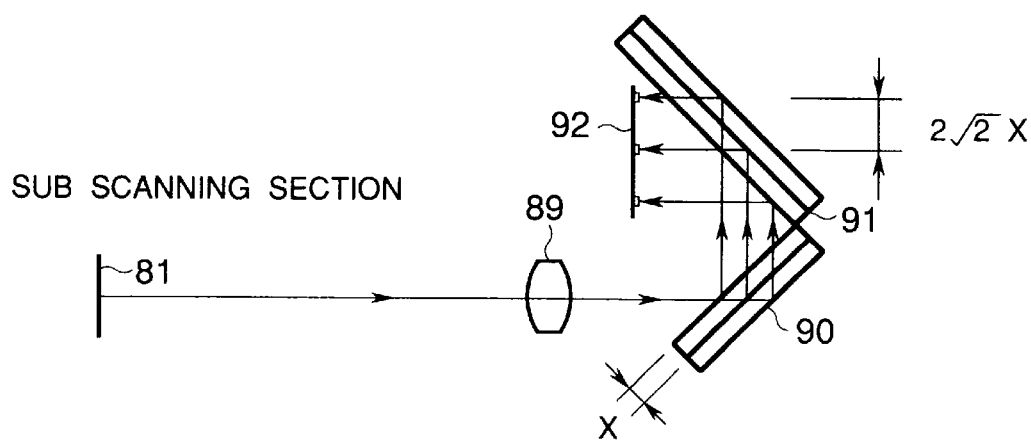
FIG. 2 is a schematic diagram to show the major part of the optical system of another conventional color image reading apparatus.
Figure 3:
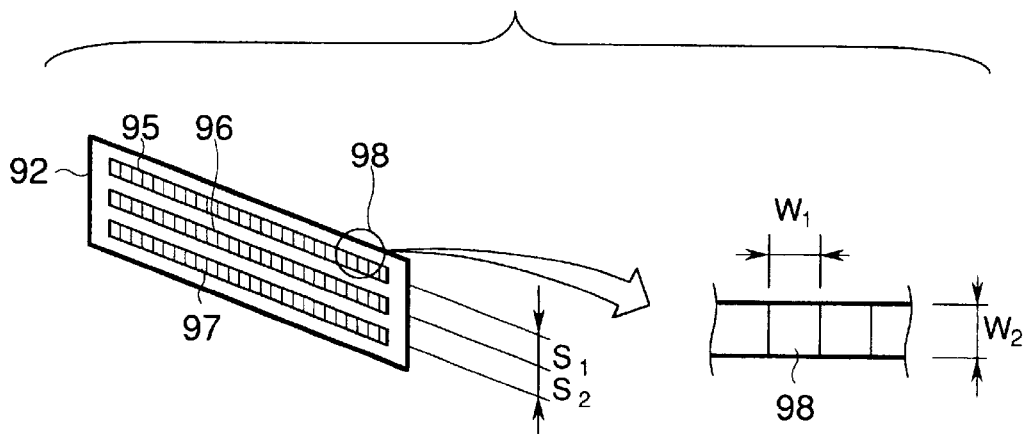
FIG. 3 is an explanatory drawing of the monolithic 3-line sensor.
Figure 4:
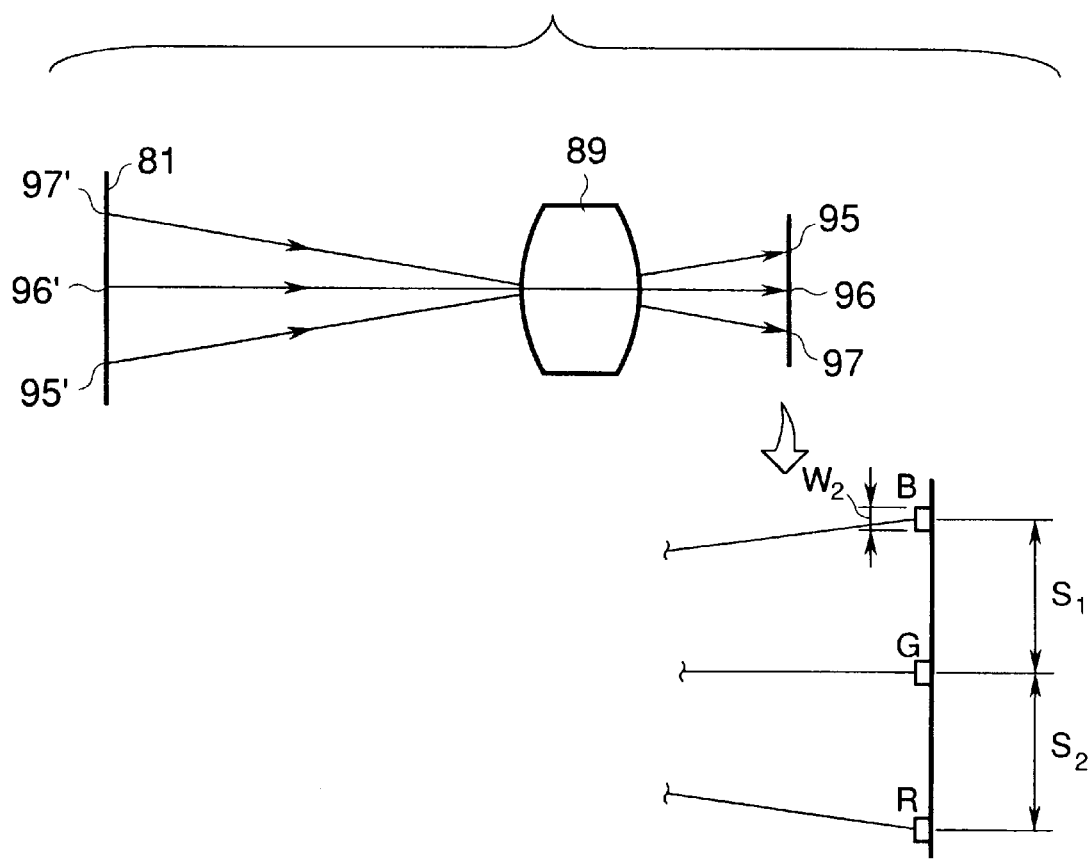
FIG. 4 is a schematic diagram to show the major part of the optical system of another conventional color image reading apparatus.
Figure 5A:
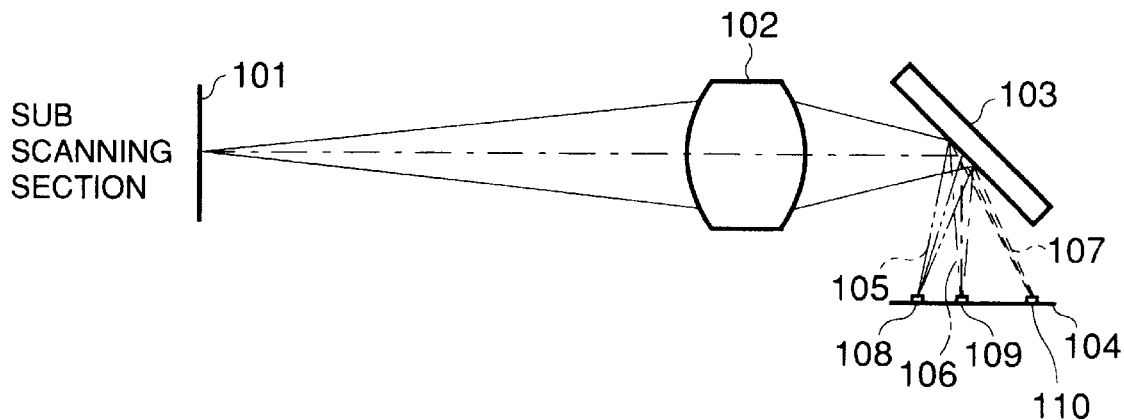
FIGS. 5A and 5B are schematic diagrams to show the major part of the optical system of another conventional color image reading apparatus.
Figure 5B:
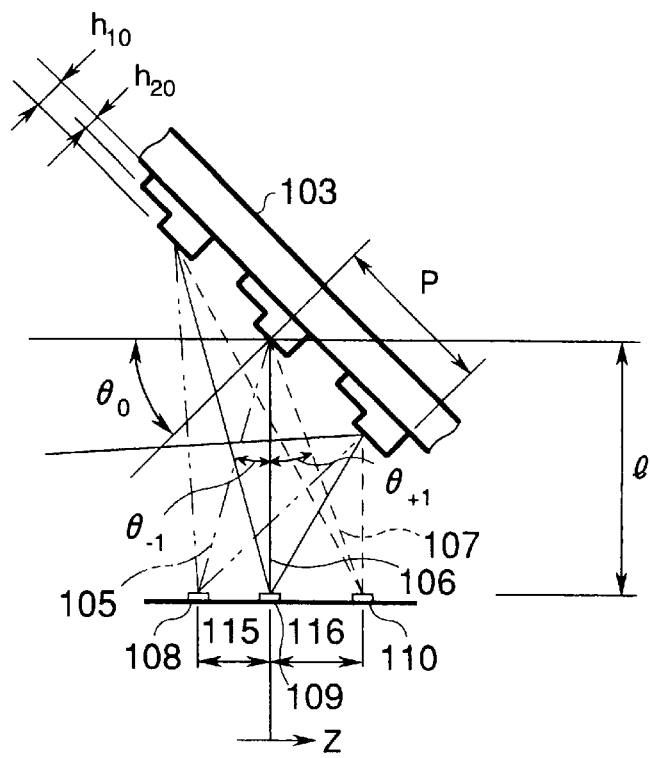
Figure 6B:
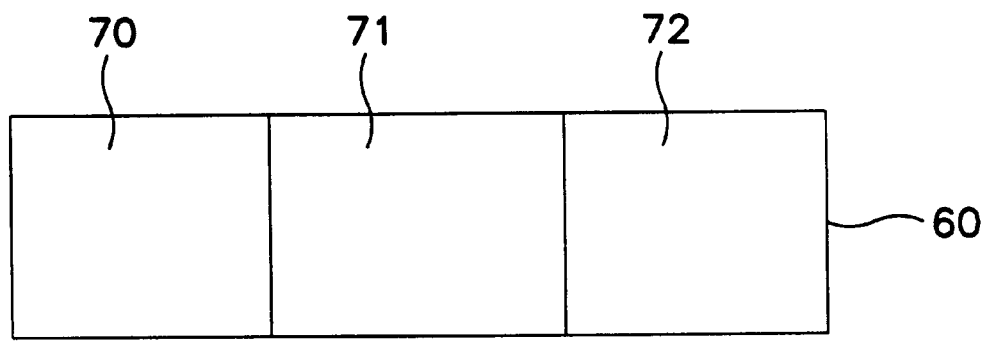
Figure 6C:
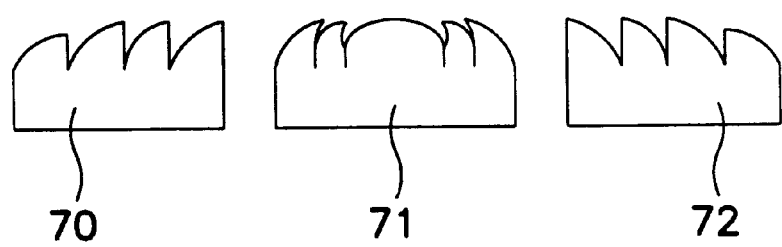
Figure 7:
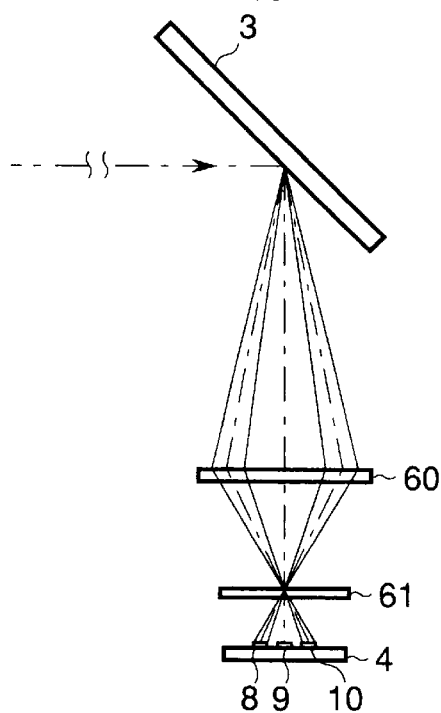
FIG. 7 is a sub scanning cross-sectional view to show how axial rays are color-separated.

FIG. 6A is a side view (sub scanning cross-sectional view) to show the major part of Embodiment 1 of the color image reading apparatus of the present invention, and the sub scanning cross section means a cross section including the optical axis and the sub scanning direction. FIG. 6B is a drawing to show the three regions of the first diffraction optical element and FIG. 6C is a side view of the three regions. FIG. 7 is a drawing to show how axial rays are color-separated.

In the drawing, numeral 1 designates an original surface being an object, in which a color image is formed. Numeral 2 denotes an imaging optical system, which focuses a beam originating from the color image on the surface of light receiving means (monolithic 3-line sensor) through the color separation means (reflection type one-dimensional blazed diffraction grating), first optical element, and second optical element, described below.

Numeral 3 represents the color separation means, which is composed of a reflection type one-dimensional blazed diffraction grating (which will also be referred to as "reflection type diffraction grating") and which separates an incident beam into predetermined color beams, for example color beams of the three primary colors of R (red), G (green), and B (blue), in the sub scanning direction perpendicular to the array direction of pixel of line sensor, and reflects and diffracts the color beams.

Figure 8:
FIG. 8 is a cross-sectional view of the major part of a diffraction optical element according to the present invention.
Figure 9:
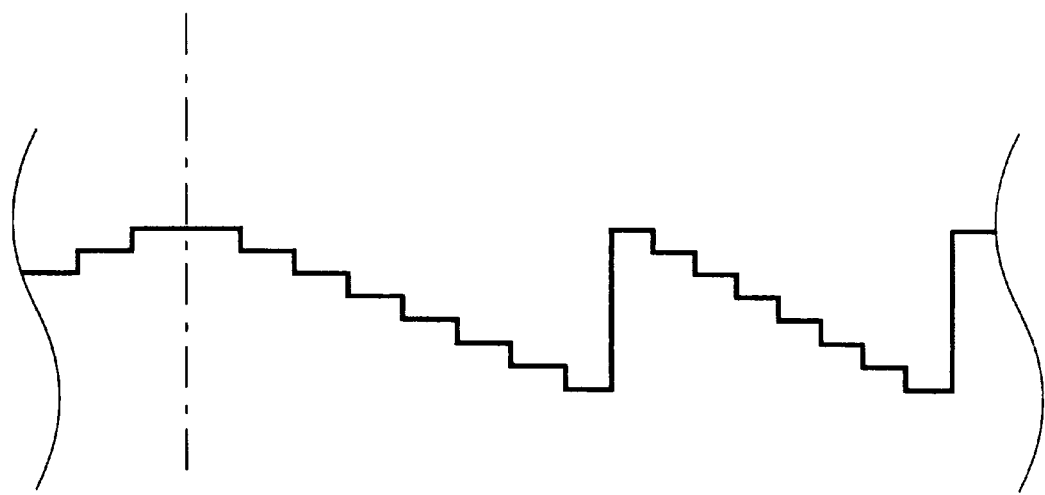
FIG. 9 is a cross-sectional view of the major part of another diffraction optical element according to the present invention.

Numeral 60 denotes the first diffraction optical element as a first optical element, which is comprised, for example, of a so-called binary optical element (BOE) of the Fresnel type as shown in FIG. 8 or a quantized step shape (for example, of eight steps) as shown in FIG. 9 and which is located near the position where the plural color beams color-separated by the color separation means 3 are once focused in the sub scanning cross section by the imaging optical system 2. Numeral 61 denotes the second diffraction optical element as a second optical element, which is comprised, for example, of a so-called binary optical element (BOE) of the Fresnel type or the quantized step shape as shown in FIG. 8 or FIG. 9, similar to the first diffraction optical element 60, and which is located in the optical path after the first diffraction optical element 60 and before the light receiving means 4 described below.

In the present embodiment, as shown in FIG. 7, the surface of the reflection type diffraction grating 3 and the surface of the second diffraction optical element 61 are set in the optically conjugate relation with respect to the first diffraction optical element 60 in the sub scanning cross section, and the surface of the first diffraction optical element 60 and the surface of the light receiving means 4 described below are set in the optically conjugate relation with respect to the second diffraction optical element 61 in the sub scanning cross section. Further, the conjugate relation in the second diffraction optical element 61 is set so as to be the imaging relation of a reduction ratio.

Numeral 4 stands for the light receiving means, which is comprised of a so-called monolithic 3-line sensor (which will also be referred to as "3-line sensor") in which three line sensors (CCDs) 8, 9, 10 are placed in parallel on the common substrate surface. An unrepresented color filter based on each color beam is provided on a surface of each line sensor 8, 9, 10, and line spaces between the line sensors 8, 9, 10 are set to different values corresponding to color separation directions of the color separation means 3 (in the sub scanning direction).

In the present embodiment the color image on the original surface 1 is line-scanned in the sub scanning direction by scanning means composed of an unrepresented mirror etc., reflected beams (information light) from the color image illuminated by an unrepresented light source for illumination are condensed by the imaging optical system 2, the light is color-separated into three color beams (for example, R, C, B) in the sub scanning direction by the reflection type diffraction grating 3, thereafter the beams are once condensed and focused on or near the surface of the first diffraction optical element 60 (the primary imaging surface), and each color image is demagnified and focused on the surface of each corresponding line sensor 8, 9, 10 (the secondary imaging surface) through the second diffraction optical element 61. Then the 3-line sensor 4 digitally reads the color images based on the respective color beams. The line sensors 8, 9, 10 extend in the main scanning direction normal to the plane of the drawing.

Figure 10:
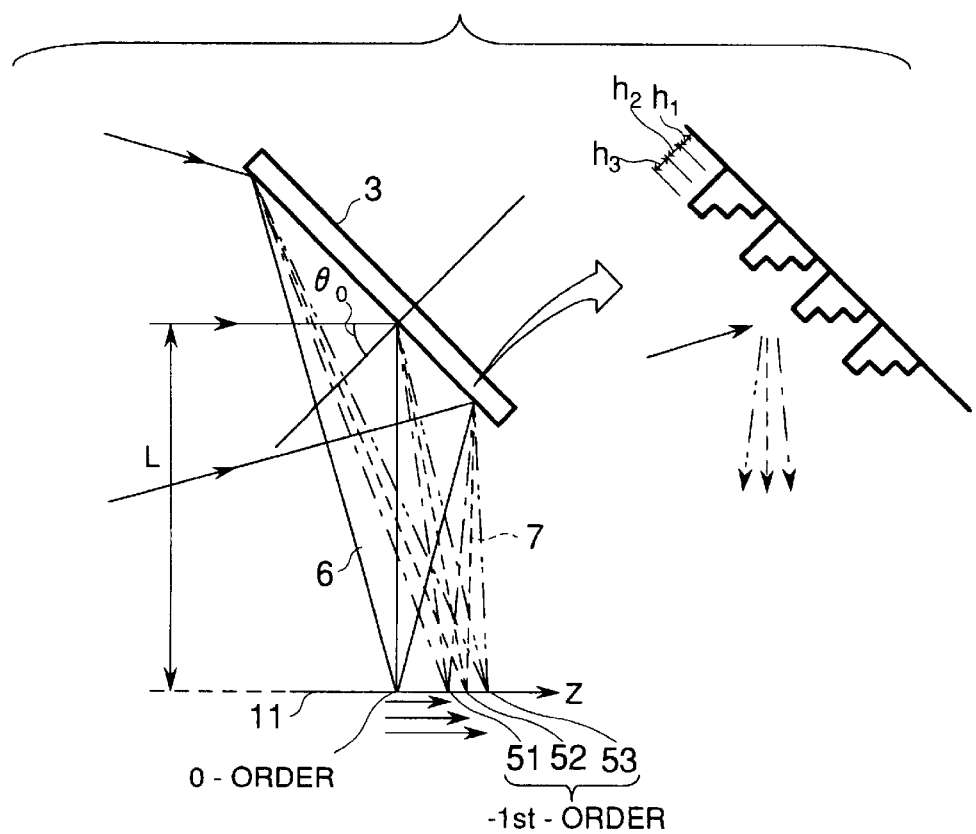
FIG. 10 is a cross-sectional view of major part for explaining the principle of the present invention.

The reflection type diffraction grating as the above color separation means is described in Applied Optics, Vol. 17, No. 15, pp 2273–2279 (1978) and the configuration thereof is as shown in FIG. 10. The reflection type diffraction grating 3 separates a beam incident thereto, reflects and diffracts separate beams into three directions of the − first-order light, the zero-order light, and the + first-order light, and focuses each light as a beam of convergent, spherical wave on the surface of each line sensor by the imaging optical system.

Incidentally, in the ± first-order diffracted beams separated and reflectively diffracted by the reflection type diffraction grating 3 as shown in FIG. 10, for example, letting Z be a separation distance of the − first-order diffracted light component once separated and focused, the distance Z is expressed as follows.

$$Z = L \times \tan\{\sin^{-1}(\pm\lambda/P + \sin\theta_0) - \theta_0\} \quad (3)$$

In Eq. (3) $\lambda$ is the wavelength of the beam separated and focused, $\theta_0$ an angle of incidence of an axial beam to the reflection type diffraction grating 3, P the grating pitch, and L the distance from the reflection type diffraction grating 3 to the once-focused image plane 11 on the optic axis.

Here, for example, in the step shape of the reflection type diffraction grating 3 shown in FIG. 10, let us suppose depths (grating thicknesses) of respective steps in the step shape are $h_1 = h_2 = h_3 = 750$ nm. Then, from the following equation:

$$2h \cdot \cos\theta_0 = m\lambda_0 \cong (m \mp 1/n)\lambda_{\pm 1} \quad (4);$$

and with (n, m) = (4, 2), $\lambda_0 = 530$ nm, $\lambda_{+1} = 606$ nm, and $\lambda_{-1} = 471$ nm.

Figure 11:
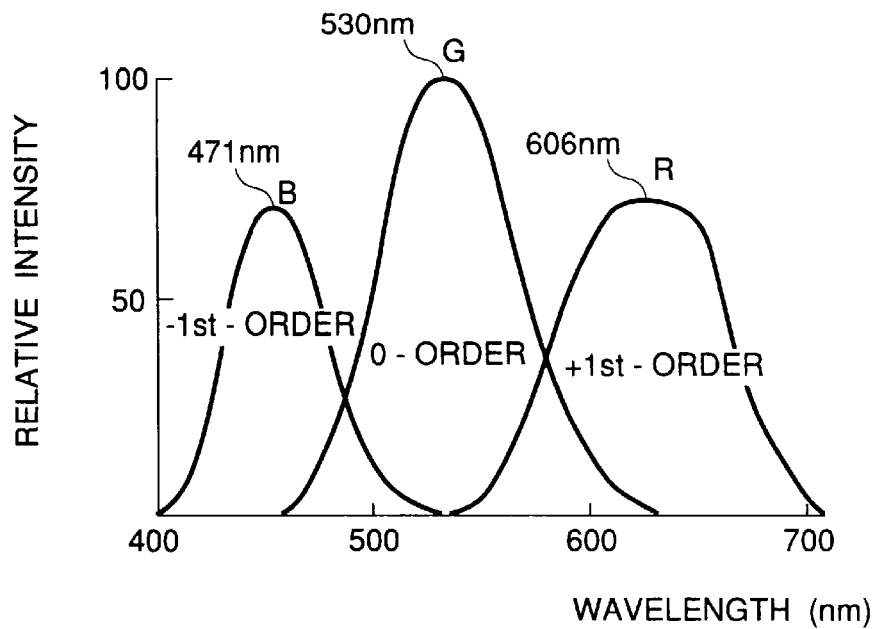
FIG. 11 is an explanatory drawing to show spectral energy distributions of respective order beams separated by the blazed diffraction grating.

At this time the − first-order diffracted beam of efficiency peak wavelength ($\lambda_{-1} = 471$ nm) is once focused at the position 52 on the once-focused image plane 11 as shown in FIG. 10. Since this − first-order diffracted light component includes wavelengths in the wavelength band of from about 400 nm to 530 nm shown in FIG. 11, it is focused with some broadening on this once-focused image plane 11 according to Eq. (3). For example, a broadening amount of the − first-order diffracted beam at the half wavelength bandwidth is approximately 20 μm or so, for example when L=35 mm, $\theta_0 = 45°$, and the center grating pitch P=160 μm. Considering the fact that the size of one pixel of line sensor (CCD) is approximately 10 μm, degradation is unavoidable in terms of the reading resolution in the sub scanning direction. From the same consideration on the + first-order diffracted light component, broadening thereof is not negligible on the image plane, either.

In the present embodiment the color images based on the ± first-order diffracted beams, focused with some broadening on the surface of the first diffraction optical element 60, are demagnified and refocused on the surface of 3-line sensor 4 through the first diffraction optical element 60 and second diffraction optical element 61 as shown in FIG. 6A, whereby the broadening amounts of the ± first-order diffracted beams are efficiently kept within each pixel of line sensor.

Let us now suppose, for example, that in the aforementioned spectral separation system the first diffraction optical element 60 has the focal length of its diffraction system being 5.84 mm and keeps the reflection type diffraction grating 3 and the second diffraction optical element 61 in the demagnifying conjugate relation at the magnification ratio $\beta_{60} = -0.2\times$. Namely, the distance $L_1$ between the first diffraction optical element 60 and the second diffraction optical element 61 is $L_1 = 7$ mm. Similarly, if the second diffraction optical element 61 is designed to reduce the broadening amounts of the ± first-order diffracted beams on the above once-focused image plane 11 by half, the reduction ratio $\beta_{61} = -0.5\times$ will be set, supposing the distance $L_2$ between the second diffraction optical element 61 and the 3-line sensor 4 is $L_2 = 3.5$ mm.

By the way, the first diffraction optical element 60 is a diffraction grating the phase function of which satisfies $\phi(\gamma) = \{(2\pi/\lambda) \times A \times \gamma^2\}(A \cong 0.086, \gamma:$ distance from the optic axis, $\lambda$: wavelength) in this example. Similarly, the second diffraction optical element 61 will have the diffraction power (refracting power) equivalent to the focal length 2.33 mm in this example and is a diffraction grating having an angle $\alpha = 5.47°$ equivalent to NA (numerical aperture) of incident beam, the center grating pitch 52.5 μm, and the peripheral grating pitch 2.1 μm approximately.

In either case, assuming the optical system is of the compact arrangement as in the above example, the focal lengths of the first and second diffraction optical elements 60, 61 both will be very small. Thus, with ordinary refracting optical systems, configurations thereof would be unpractical in terms of the radius of curvature or the like. Accordingly, the present embodiment employs the diffraction optical system as described above, thereby achieving the compact optical system.

As described above, the present embodiment is constructed in such arrangement that each of the diffracted beams of the respective orders separated and reflectively diffracted by the reflection type diffraction grating 3 is once focused as described above and the diffraction optical elements 60, 61 are located on the image plane and in the optical path between the image plane and the surface of the 3-line sensor 4 and that the broadening, which is to be said as fine color blur on the image plane (on the primary image plane) occurring when the ± first-order diffracted light components include a finite wavelength band, is reduced and refocused on the surface of the final 3-line sensor (on the secondary image plane), whereby the broadening can be kept within the pixels of each line sensor, thereby preventing lowering of resolution in the sub scanning direction.

Embodiment 2 of the present invention will be described. The present embodiment is different from Embodiment 1 described above in that the first diffraction optical element is divided into at least three regions and elements in the three regions thus divided have mutually different element structures. The other structure and optical function are substantially the same as in Embodiment 1 described above, thereby achieving the same effect.

Specifically, Embodiment 1 described above employed the integral diffraction optical element having the element structure of one region as the first diffraction optical element, whereas the present embodiment is constructed in such arrangement that, because the zero-order diffracted beam and ± first-order diffracted beams are separated on the surface of the first diffraction optical element, which is also the once-focused image plane, the first diffraction optical element is divided into three regions (three diffraction optical elements) corresponding to the separate diffracted beams and that the element structures of the elements in the three separate regions are constructed based on mutually different optical specifications, which can be applied in the same manner as Embodiment 1 described above. As shown in FIGS. 6B and 6C, region 70 corresponds to the + first order diffracted beam, region 71 corresponds to the zero-order diffracted beam, and region 72 corresponds to the − first order diffracted beam.

Figure 12:
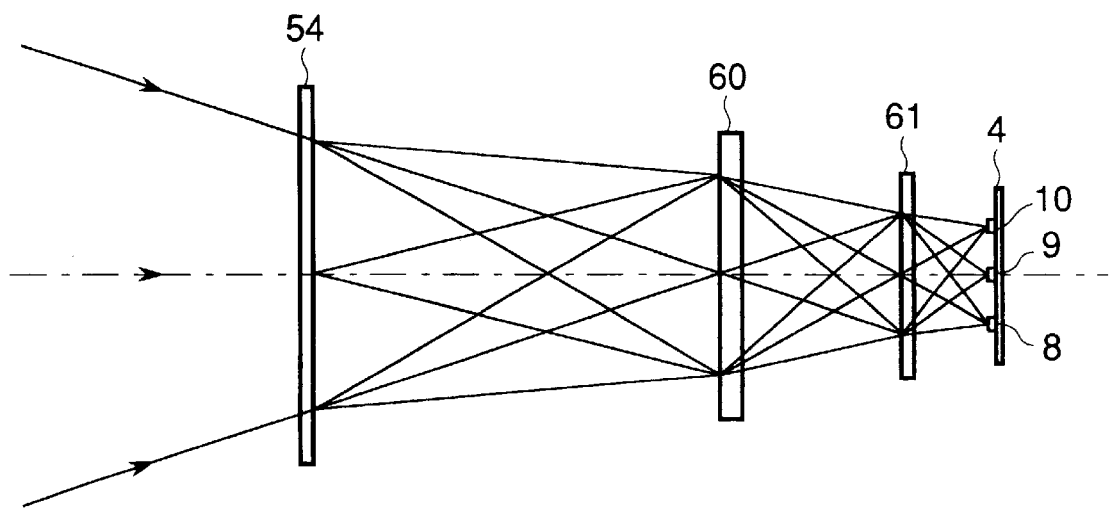
FIG. 12 is a sub scanning cross-sectional view of the major part of Embodiment 3 of the present invention.

FIG. 12 is a side view (sub scanning cross-sectional view) of major part to show the main part of Embodiment 3 of the present invention. In the same drawing the same elements as those shown in FIG. 6A are denoted by the same reference symbols.

The present embodiment is different from Embodiment 1 described above in that the one-dimensional blazed diffraction grating as the color separation means is a transmission type one-dimensional blazed diffraction grating. The other structure and optical function are substantially the same as in Embodiment 1 described above.

In the drawing numeral 54 denotes the transmission type one-dimensional blazed diffraction grating (which will be referred to as "transmission type diffraction grating"), and the incident beam to the transmission type diffraction grating 54 is transmitted and diffracted to be color-separated mainly into three directions, as disclosed in Applied Optics, Vol. 17, No. 15, pp 2273–2279 (1978).

The present embodiment uses the transmission type diffraction grating 54 as the color separation means as described, and the two diffraction optical elements 60, 61 are located in the optical path between the transmission type diffraction grating 54 and the 3-line sensor 4 as in aforementioned Embodiment 1, thereby achieving the same effect as in aforementioned Embodiment 1.

As well known in use of diffraction optical element, there is the relation of f·λ=constant between the focal length f thereof and the wavelength λ, which indicates inverse dispersion to the ordinary refracting glass systems. Accordingly, the diffraction optical elements can inversely correct for residual chromatic aberration given rise to by the imaging optical system or the like in FIG. 6A described above and can also correct for chromatic aberrations of the first and second diffraction optical elements each other. This permits us to obtain the optical system with sufficiently high imaging performance in the broad wavelength band.

Each of the above embodiments was arranged to have the two diffraction optical elements in the optical path between the color separation means and the light receiving means, but the present invention can also be applied similarly to the arrangement of only one diffraction optical element, in the same manner as in the embodiments described above.

The present invention can achieve the color image reading apparatus constructed in such arrangement that, for reading the color image by the monolithic 3-line sensor as the light receiving means while colorseparating it by use of the reflection type or transmission type one-dimensional blazed diffraction grating as the color separation means, the diffraction optical element is located in the optical path between the one-dimensional blazed diffraction grating and the monolithic 3-line sensor as described above, thereby relaxing the broadening to be called the fine color blur on the surface of light receiving means occurring when the ± first-order diffracted light components separated and diffracted by the one-dimensional blazed diffraction grating each include a finite wavelength band, whereby the apparatus can digitally precisely read, for example, the three color beams of R, G, and B without lowering the reading resolution in the sub scanning direction and without limiting the wavelength band.

Further, the present invention can achieve the color image reading apparatus that can theoretically eliminate color deviation caused by mechanical blur or the like upon scan reading likely to occur in ordinary 3-line reading.

What we claimed is:

1. A color image reading apparatus comprising:

light receiving means having a plurality of line sensors disposed on a surface of a common substrate;

an imaging optical system for forming an image or an object;

a blazed diffraction grating, disposed in an optical path between said imaging optical system and said light receiving means, for color-separating a beam from said object into a plurality of color beams;

a first optical element provided near a position where said plurality of color beams are focused in a sub scanning cross section by said imaging optical system; and a second optical element provided in an optical path between said first optical element and said light receiving means, wherein said plurality of color beams are focused on said first optical element and focused again on said light receiving means through said second optical element.

2. A color image reading apparatus according to claim 1, wherein said plurality of color beams color-separated by said blazed diffraction grating are focused on said light receiving means through said first optical element and said second optical element.

3. A color image reading apparatus according to claim 1, wherein said blazed diffraction grating and said second optical element are in an optically conjugate relation with respect to said first optical element in the sub scanning cross section, and wherein said first optical element and said light receiving means are in an optically conjugate relation with respect to said second optical element in the sub scanning cross section.

4. A color image reading apparatus according to claim 3, wherein the conjugate relation in said second optical element is an imaging relation of a reduction ratio.

5. A color image reading apparatus according to claim 1, wherein said first optical element is divided into at least three regions and elements in said three regions have mutually different element structures.

6. A color image reading apparatus according to claim 1, wherein said first optical element is a diffraction optical element.

7. A color image reading apparatus according to claim 1, wherein said second optical element is a diffraction optical element.

8. A color image reading apparatus according to claim 1, wherein said blazed diffraction grating is a reflection type one-dimensional blazed diffraction grating.

9. A color image reading apparatus according to claim 1, wherein said blazed diffraction grating is a transmission type one-dimensional blazed diffraction grating.

* * * * *

UNITED STATES PATENT AND TRADEMARK OFFICE
CERTIFICATE OF CORRECTION

PATENT NO. : 6,016,222

DATED : January 18, 2000

INVENTOR(S): MICHITAKA SETANI, ET AL.     Page 1 of 2

It is certified that error appears in the above-identified patent and that said Letters Patent is hereby corrected as shown below:

Column 1

Line 23, "u se" should read --use--; and
    Line 49, "by," should read --by--.

Column 2

Line 36, "after" should read --after being--.

Column 5

Line 47, "FIGS. 6A, 6B, and 6C are" should read --FIG. 6A is--; and
    Line 50, "6A" should read --6C--.

Column 7

Line 7, "C," should read --G,--.

UNITED STATES PATENT AND TRADEMARK OFFICE
CERTIFICATE OF CORRECTION

PATENT NO. : 6,016,222
DATED : January 18, 2000
INVENTOR(S): MICHITAKA SETANI, ET AL.

It is certified that error appears in the above-identified patent and that said Letters Patent is hereby corrected as shown below:

Column 8

Line 38, "unpractical" should read --impractical--.

Column 9

Line 50, "elements each other." should read
--elements.--.

Column 10

Line 14, "What we claimed is:" should read --What we claim is:--.

Signed and Sealed this

Fifteenth Day of May, 2001

Attest:

NICHOLAS P. GODICI

Attesting Officer     Acting Director of the United States Patent and Trademark Office